United States Patent [19]

Turner, Jr.

[11] 4,231,025
[45] Oct. 28, 1980

[54] LEVEL AND TEMPERATURE READOUT AND ALARM SYSTEM

[75] Inventor: John H. Turner, Jr., Cambridge, Mass.

[73] Assignee: Metritape, Inc., West Concord, Mass.

[21] Appl. No.: 90,392

[22] Filed: Nov. 1, 1979

[51] Int. Cl.³ .............................................. G08B 19/00
[52] U.S. Cl. .................................. 340/521; 340/52 F; 340/508
[58] Field of Search ............... 340/52 F, 500, 506, 340/508, 509, 5 17, 521

[56] References Cited
U.S. PATENT DOCUMENTS

| 3,764,984 | 10/1973 | McCartney | 340/521 |
| 4,034,335 | 7/1977 | Harazoe et al. | 340/521 |
| 4,038,634 | 7/1977 | Caliri | 340/521 |
| 4,053,868 | 10/1977 | Cox et al. | 340/521 |
| 4,140,996 | 2/1979 | Leitch et al. | 340/521 |

Primary Examiner—Alvin H. Waring
Attorney, Agent, or Firm—Weingarten, Maxham & Schurgin

[57] ABSTRACT

For use with a resistance level and temperature sensor, operative to provide a measure of the level and temperature of a fluent material, a readout and alarm system operative to provide a numerical readout of material level and temperature as well as visual and audible indications of alarm conditions. The system is contained within a portable housing which can be employed in hostile environments and which can provide intrinsically safe operation in explosive atmospheres.

13 Claims, 9 Drawing Figures

LEVEL AND TEMPERATURE READOUT AND ALARM SYSTEM

FIELD OF THE INVENTION

This invention relates to the measurement of liquid and other fluent material level and temperature and more particularly to instruments for providing numerical indication of material level and temperature and for indicating associated alarm conditions.

BACKGROUND OF THE INVENTION

In the loading, transfer and safe storage of bulk liquids, such as in the tanks of ships and barges and stationary storage tanks, it is important to provide operators with clear and accurate indications of liquid levels and liquid temperatures. Bulk liquid and handling facilities often employ line-powered largescale remotely monitored systems for providing indications of liquid level and temperature and alarm conditions. However, it is often required to monitor level and temperature at the tank facility or at local outdoor pump or valve control stations. Such local sites are often exposed to hostile ambient conditions such as on the decks of a ship. Heretofore, information on material level and temperature was obtained manually by use of a dip stick or hand line inserted through an open access port in the top of the tank to provide a measure of liquid level, or insertion of a thermometer into the tank for measurement of temperature. The opening of such access ports can be extremely hazardous to the operator by exposure to vapors that can be toxic and by increasing the risk of vapor and liquid pollution from the opened tank, and in addition can be violative of safety laws. Liquid transfer on ships and on tank farms, especially where complex inflow and outflow operations are being performed simultaneously, can result in serious spillage if accurate monitoring of level is not provided continuously during such operations.

SUMMARY OF THE INVENTION

In brief, the present invention provides a portable instrument for use with one or more resistance level and temperature sensors to provide numerical readout of level and temperature and visual and audible indications of alarm conditions. The instrument is contained within a portable battery-powered enclosure, and is preferably of intrinsically safe construction for use in explosive atmospheres and of sealed construction for use in hostile environments. The novel instrument provides all of the indication, alarming and self-checking features of large remote centralized line powered instrumentation systems but in a package which is extremely compact, battery powered and of reliable and accurate performance.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
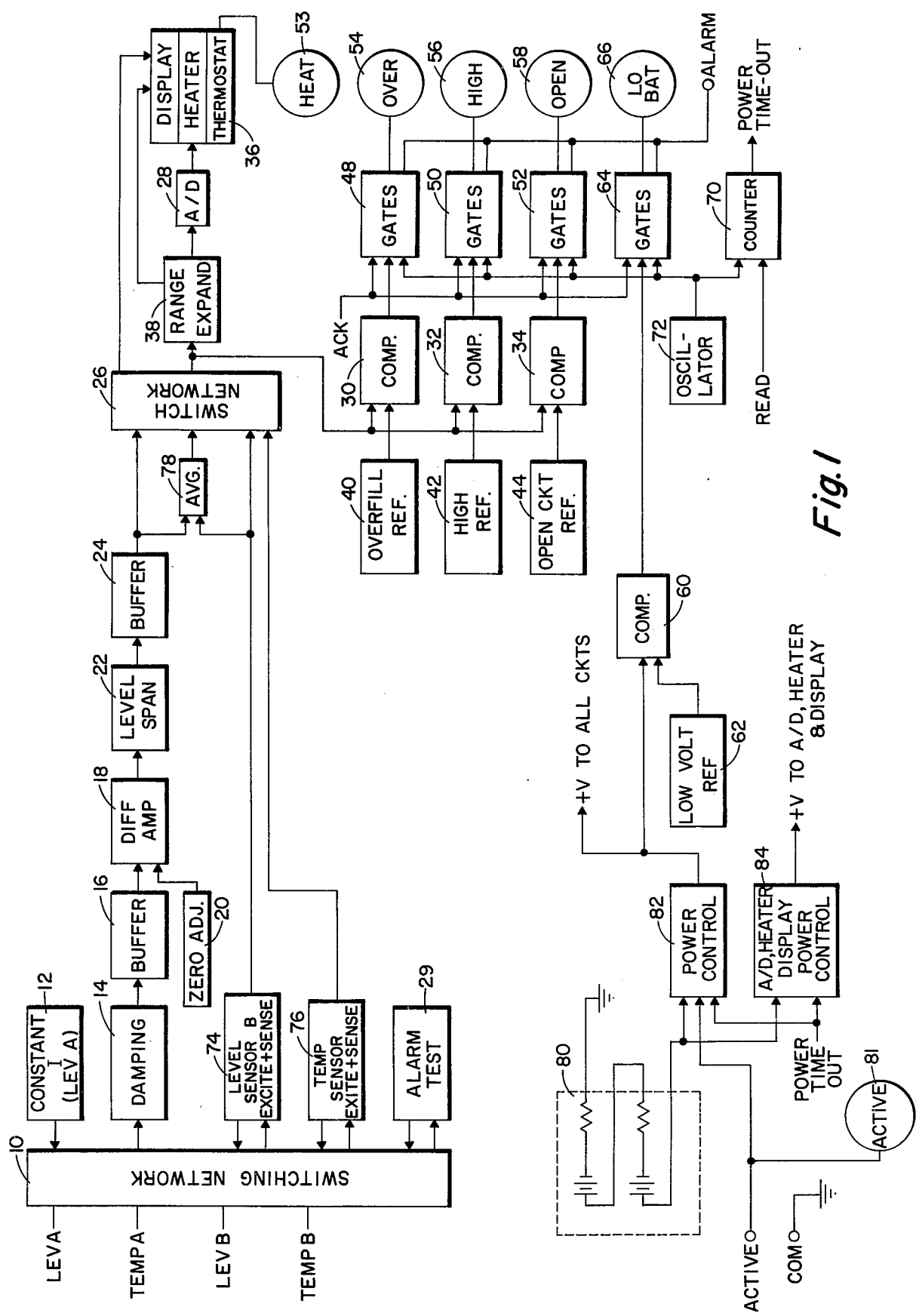
FIG. 1 is a block diagram of the readout and alarm circuitry of the invention.

Referring to FIG. 1 there is shown a block diagram of the electronic circuitry for providing a numerical display of material level or temperature and indications of alarm conditions. The illustrated embodiment is for use with two resistance level sensors and two resistance temperature sensors. The sensors are preferably Metritape level/temperature sensors of Metritape, Inc., Concord, Mass. The Metritape level sensor is described in U.S. Pat. Nos. 3,153,342, 3,511,090, 3,653,262, and comprises an elongated sensor disposed in a fluent material storage vessel and having a helical resistance element wound around a base strip and operative to selectively contact the strip in accordance with material level and to provide a voltage of magnitude representing such level. The temperature sensor is a resistance temperature sensor, usually located on the level sensor, and providing a voltage representing the temperature of the fluent material. Each sensor functions electrically as a potentiometer to produce in response to a constant current, a resistance and therefore a voltage representing level or temperature, as the case may be.

One of the level sensors is connected to the input terminals labeled Lev A, while the other level sensor is connected to the input terminal labeled Lev B. The temperature sensors are connected to the respective input terminals labeled TEMP A and TEMP B. The level and temperature sensors are coupled by means of a switching network 10 to the associated circuitry. A constant current source 12 provides a predetermined constant current via switching network 10 to level sensor A for energization of the resistance sensing element thereof. The sensor output voltage, which is indicative of material level or ullage, is coupled via the switching network 10 to a damping circuit 14 and a buffer 16 to one input of a differential amplifier 18. A voltage reference source 20 provides a reference voltage to the second input of differential amplifier 18. The reference voltage indicates a zero level condition (tank empty) when the level sensor is employed to measure material level, or a full tank condition when the sensor is employed to measure ullage. The differential amplifier provides an output signal which is representative of material level or ullage depending upon the measurement mode in which the level sensor is employed.

The differential amplifier output signal is applied to a level span circuit 22 and thence via a buffer 24 to a switching network 26 which provides the signal to the input of an analog-to-digital converter 28, and to one input of respective comparators 30, 32 and 34. The circuit 22 includes a control for adjusting the resistance gradient to a predetermined ohmage per unit length, to calibrate the sensor output in accordance with the resistance gradient of the particular sensor employed and in accordance with the active length of the sensor, and to calibrate for the desired units of measurement. The digital output of the converter 28 is applied to a numerical display 36, which preferably is a liquid crystal display having an associated heater to allow reliable numerical indication even at temperatures below freezing. A range expand circuit 38 is coupled to converter 28 and display 36 and is operative to automatically shift the decimal point of the displayed data in accordance with the level or temperature range within which a measurement is present. Typically, level is displayed in ranges from 0-19.99 and 20-199.9.

Each of the comparators 30, 32 and 34 receives a reference voltage from respective reference voltage sources 40, 42 and 44. The source 40 provides a reference voltage which indicates an overfill level. The voltage reference from source 42 provides an indication of a high level, while the reference voltage from source 44 indicates an open circuit fault condition. An alarm test circuit 29 is coupled to switching network 10 and provides a complete functional test of the sensing and alarm circuitry. This test circuit provides a short circuit condition across the level sensor input terminals to simulate a high or overfill alarm condition, and a supply voltage V across the level sensor input terminals to simulate an open circuit alarm condition. The output of respective comparators 30, 32 and 34 are coupled via respective gates 48, 50 and 52 to respective indicators 54, 56 and 58. Typically, these indicators are light emitting diodes and respectively denote an overfill alarm condition, a high alarm condition and an open circuit alarm condition. The high alarm condition signifies material level above a predetermined full level, while the overfill alarm condition signifies material level above the high material level. These two level alarms can be set by adjustment of the corresponding reference voltages to define the actual levels at which the alarms will be actuated. The open circuit alarm denotes an open circuit or high resistance sensor input such as would occur from a broken sensor leadwire. Sensing an indication of a low battery condition is provided as follows. A comparator 60 receives the battery voltage as one input. A reference voltage from a source 62 is the second input. The output from comparator 60 is applied via a gate 64 to a low battery indicator 66 which is typically a light emitting diode. The outputs of gates 48, 50, 52 and 64 also provide an alarm drive signal at an output terminal 68 which is connected to an associated horn sounder, to be described, which is operative to provide an audible indication of an alarm condition.

A counter 70 is triggered by actuation of the read control when it is desired to activate the numerical display and analog-to-digital converter 28. The counter is driven by an oscillator 72 to provide a time interval, typically one minute, during which the numerical display, analog-to-digital converter and display heater would be active. The oscillator 72 also provides a flashing signal to the gates 48, 50, 52 and 64 to cause the indicators 54, 56, 58 and 66 to blink between the time of alarm initiation and alarm acknowledgement. The alarm drive signal 68 is present from alarm commencement until the acknowledge command.

An excitation and sense circuit 74 is provided for level sensor B, and includes a constant current source and sensing circuitry identical to that described above. Similar circuitry 76 is provided for excitation and sensing of the resistance temperature sensor. The output of circuitry 74, which is the output voltage of level sensor B, is coupled via switching network 26 to the associated display and alarm circuitry. The output signals of level sensors A & B are applied to an averaging circuit 78 which provides an output signal representative of the average material level or ullage measured by both sensors such that indication of average level can be displayed. The output of circuitry 76 which represents the temperature sensor signal is coupled via switching network 26, to the display. By operation fo the selection switches associated with switching network 26, display can be provided of material level or ullage as measured by each level sensor, an average of such level sensor readings, and material temperature.

Power for the display and alarm circuitry is provided by a battery source 80 which is coupled to a power control circuit 82 and to a heater and display power control circuit 84. The control circuit 84 provides power to display 36 and associated heater and analog-to-digital converter 28. The display heater has an integral thermostat to avoid applying unnecessary heat. A HEAT indicator 53 is illuminated when heat is being applied to the display. Control circuit 84 is driven by the timed output of counter 70. The control circuit 82 provides power to all other circuits. The active terminal 86 and common terminal 88 are adapted for coupling to corresponding terminals of the horn sounder to be described. An active light 81 denotes that the system is in operative condition with the horn sounder converted and energized. The battery 80 is composed of two 6 volt batteries or battery packs and associated current limiting resistors, each typically 7.5 ohms, connected in series to provide a 12 volt supply having maximum current which is within the specifications for intrinsically safe operation. As will be described below, the same battery source, with the two batteries in parallel connection, serves in the horn sounder to provide a 6 volt supply also having maximum current sufficiently limited for intrinsically safe operation.

Figure 2:
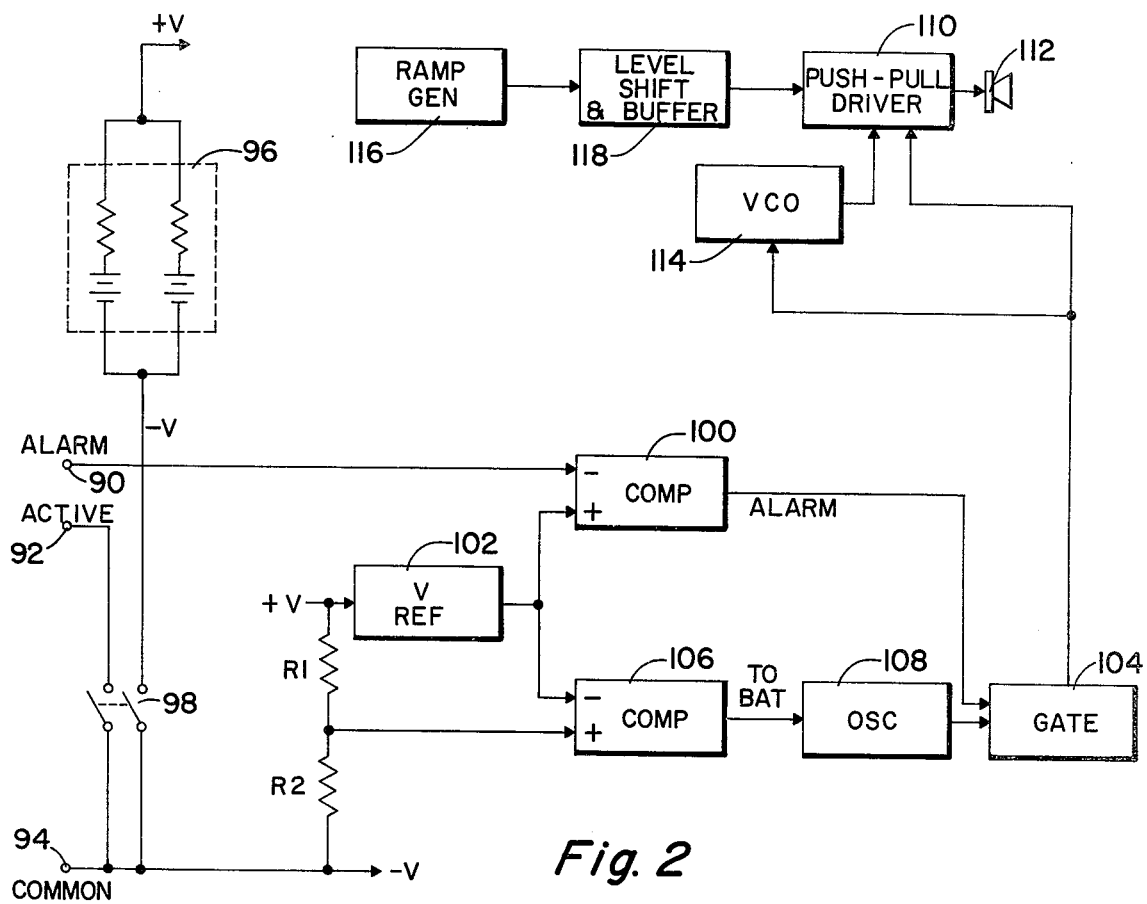
FIG. 2 is a block diagram of the audible sounder of the present invention.

The horn sounder circuit as shown in FIG. 2 incldes an alarm terminal 90, an active terminal 92 and a common terminal 94 which are adapted for connection to the correspondingly labeled terminals of the display and alarm circuitry of FIG. 1. A battery source 96 provides power for the horn sounder circuitry and is enabled by one arm of a switch 98, the other arm of which selectively interconnects the active and common terminals. The battery source is the same as source 80 but is connected with the two batteries in parallel for 6 volt intrinsically safe operation. An alarm signal provided on alarm terminal 90 is applied to the negative input of a comparator 100, the positive input of which is provided from a reference source 102. If the horn sounder circuit is ON (switch 98 closed) and the alarm input 90 is disconnected, comparator 100 will sense an alarm condition and activate gate 104. The comparator output signal is coupled to a gate circuit 104. A comparator 106 also receives a voltage from reference source 102 and a second input voltage derived from a voltage divider composed of resistors R1 and R2. The output of comparator 106 is applied to an oscillator 108 which provides pulsed drive signals to gate 104. This pulsed drive signal is indicative of low voltage from battery assembly 96. The gate circuit provides drive signals to a push-pull driver 110 which drives a loudspeaker 112. The gate circuit also provides signals to a voltage controlled oscillator (VCO) 114 which is also coupled to push-pull driver 110. A ramp generator 116 provides ramp signals via level shift and buffer circuit 118 to the push-pull driver 110.

Figure 3:
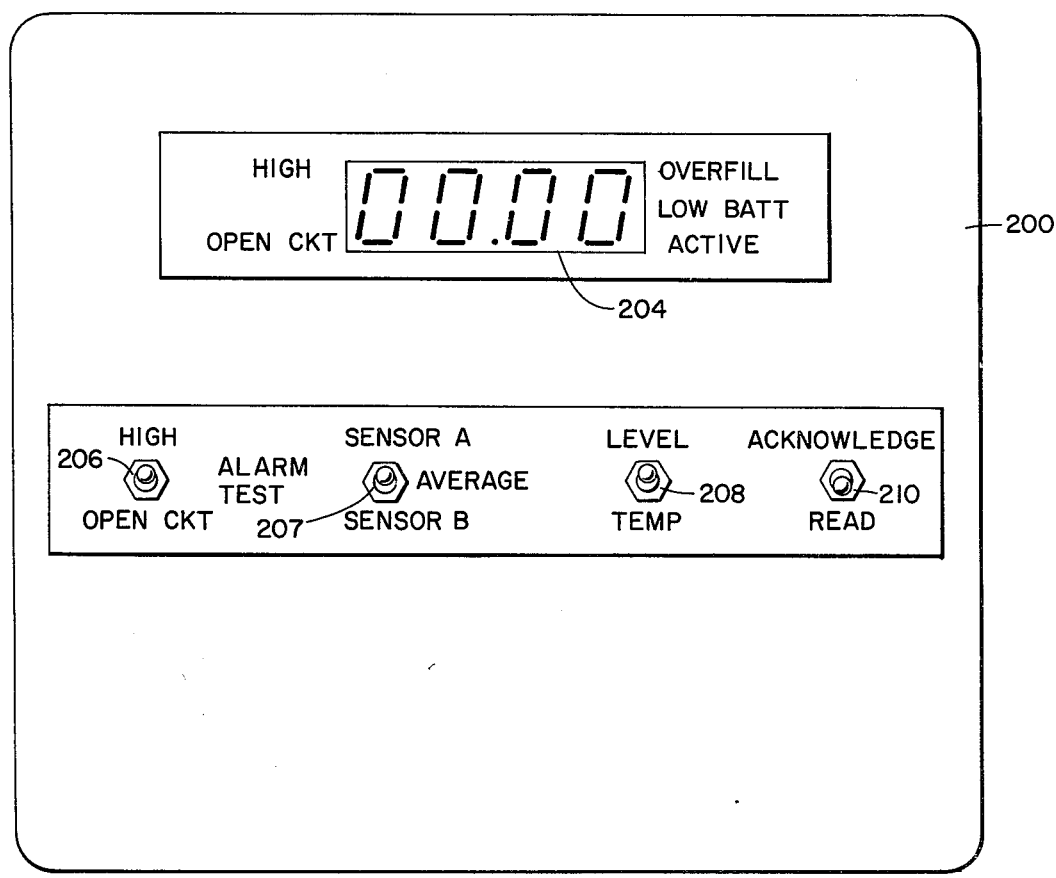
FIG. 3 is a view of the instrument housing front panel controls and indicators.

The readout and alarm circuitry of FIG. 1 is typically housed in a weatherproof enclosure 200 having the front panel controls and indicators as shown in FIG. 3. The numerical readout is provided behind a transparent window 204, as are the alarm indicators associated with the respective alarm condition labels provided behind window 204. A three position switch 206 when pushed to an up position, provides testing of the high and overfill alarms. In this position, the high and overfill alarm lamps flash and the audible alarm is sounded. With switch 206 in the down position, the open circuit alarm is tested and in this position the open circuit lamp will flash and the audible alarm with sound. Switch 207 is a three position switch for selecting sensor A (up), Sensor B (down) or the average of Sensor A and B (middle). Switch 208 is a two position switch which is in an up position for display of level and a down position for display of temperature. Typically, this switch spring returns to its up position to normally read level. The switch 210 is in a normally off center position and with momentary up and down positions. In the down position, the display is activated along with any alarms which may be present, and starts the time-out interval. In the up position, the alarm condition which has been sensed is acknowledged and flashing alarm indicators are rendered steady and the audible alarm is silenced.

Figure 8:
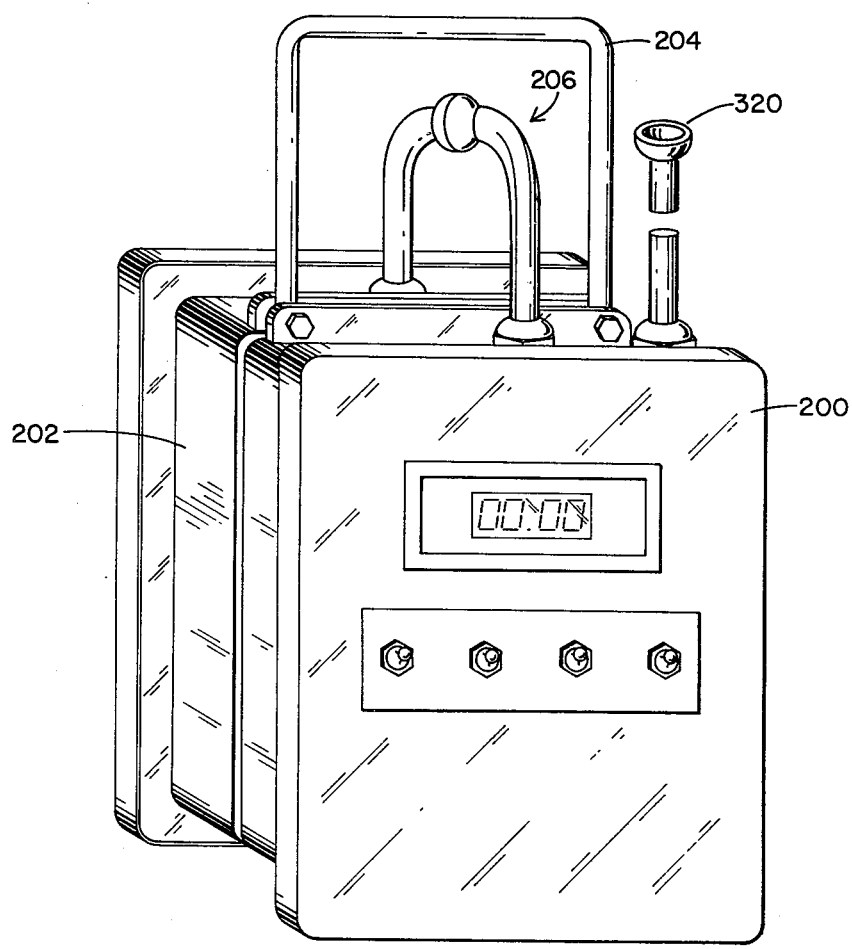
FIG. 8 is a pictorial view of the dual housings for the instrument.

The instrument enclosure is shown in FIG. 8 and includes a housing 200 which contains the readout and alarm circuitry and associated controls and indicators, and a housing 202 which contains the horn sounder. These housings are mounted back-to-back with a carrying handle 204 interposed between the connected housings. Both housings are of weatherproof construction to shield the circuitry from moisture, dust and the like. The loudspeaker of the horn sounder is mounted on the rearward facing surface of enclosure 202. The readout and alarm circuitry within housing 200 and the horn sounder circuitry within housing 202 are interconnected by a cable and connector assembly 206. The input sensors are coupled to the readout and alarm circuitry by means of a connector 320 and associated cable extending from housing 200. The housings 200 and 202 can also be permanently mounted at an operating location. One horn sounder can be shared by more than one readout and alarm unit by interconnection in parallel of the several readout and alarm units to the sounder.

Figure 4:
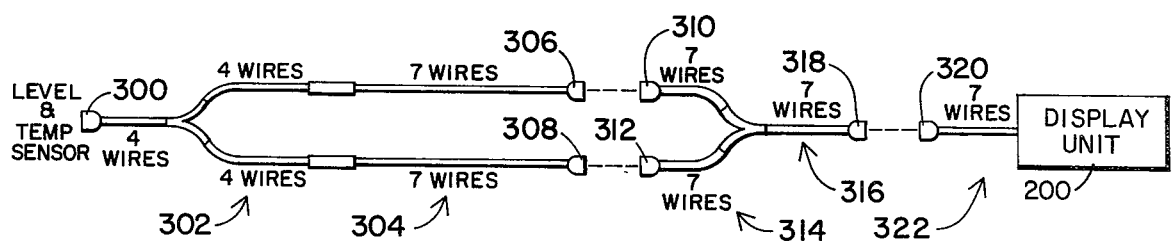
FIG. 4 is a schematic diagram of the electrical cabling employed in the invention.
Figure 7:
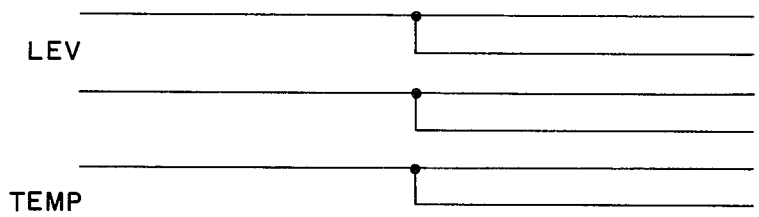
FIGS. 6 and 7 are schematic diagrams of the wire splicing arrangement employed in the cabling of FIGS. 4 and 5.
Figure 6:
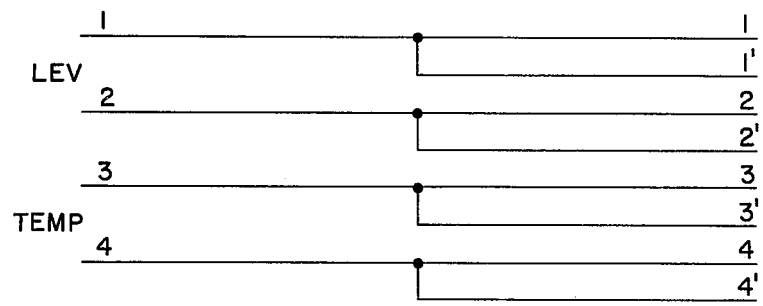

The readout and alarm unit is connected to the level/temperature sensors by means of cables which provide redundant signal paths and self protection of the external connectors. The cabling arrangement is shown in FIG. 4. A connector 300 has four terminals; two for connection to a level sensor and the other two for connection to a temperature sensor. The four wires of the cable associated with connector 300 are spliced into dual four wire cables 302 to provide redundant signal paths for the level and temperature signals. The splicing of the four wire cable into dual four wire cables is as depicted in FIG. 6. Each four wire cable 302 is spliced into dual seven wire cables 304 to provide further redundancy. Such four-to-seven splicing is illustrated in the wiring diagram of FIG. 7. Each seven wire cable 304 terminates in respective connectors 306 and 308 which are adapted to mate with corresponding connectors 310 and 312. Each connector 310 and 312 is associated with a respective seven wire cable 314 which is spliced into a single seven wire cable 316 which terminates in a connector 318. Connector 138 is matable with a connector 320 which has a seven wire cable 322 connected to the readout and alarm unit 200. The cables and connectors are of approved type providing intrinsically safe operation.

When the readout and alarm unit is disconnected from the level and temperature sensors by disconnection of connectors 306 and 308 from associated connectors 310 and 312, these external connectors can be mated to provide self protection of the external terminals to prevent exposure of the electrical connections to the environment. Thus connectors 306 and 308 can be mated to isolate electrical terminals of the level and temperature sensors from the environment, while connectors 310 and 312 can be similarly mated to isolate the electrical connectors of the readout and alarm unit from the environment.

Figure 5:
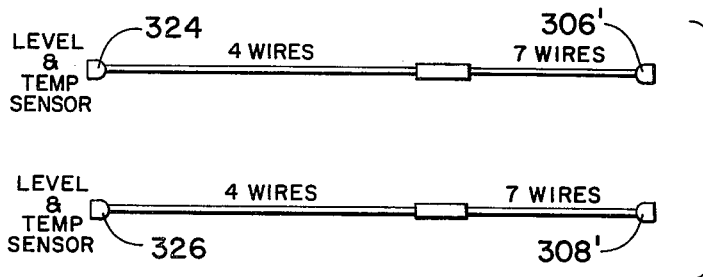
FIG. 5 is a schematic diagram of an alternative cabling arrangement employed in the invention.

In the event that dual sensors are employed, the cabling arrangement is as shown in FIG. 5. Each level/temperature sensor is coupled by means of a respective connector 324 and 326 to an associated four wire cable, each of which is spliced into a seven wire cable terminating in respective connectors 306' and 308'. The connectors 306' and 308' are matable with respective connectors 310 and 312 in the manner described above.

Figure 9:
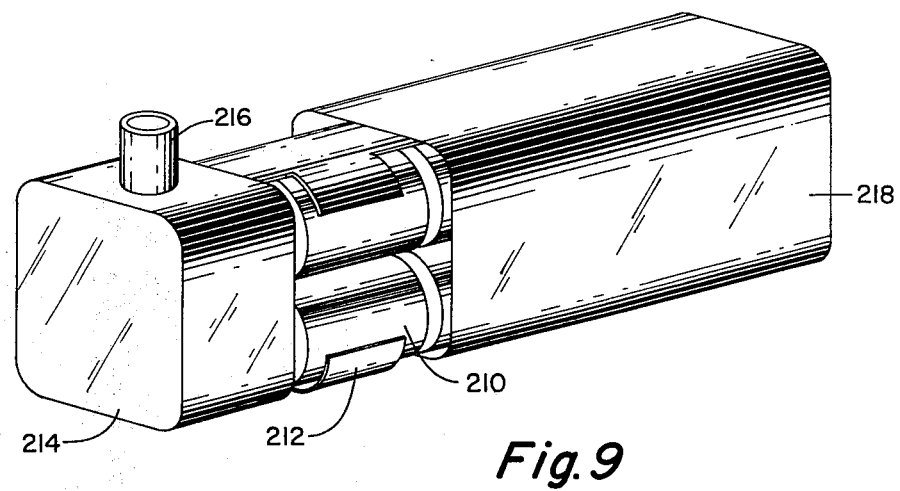
FIG. 9 is a pictorial view of the battery source.

The battery sources 80 and 96 are each embodied as shown in FIG. 9. This assembly employs standard cells such as alkaline D cells and provides an intrinsically safe source capable of providing either of two supply voltages. In the illustrated embodiment, eight D cells are employed, with four cells being mounted and series connected in respective packs to provide 6 volt outputs. A separate pair of output terminals is provided for each 6 volt pack and by appropriate external connection either 6 volt or 12 volt operation is provided, both being at current levels within the requirements for intrinsically safe operation. The 6 volt limited current is four times that of the 12 volt limited current. As shown in FIG. 9, the standard cells 210 are contained within a battery holder 212 which is attached to a case 214. The current limiting resistors and associated interconnecting wiring are encapsulated within the case 214, and an output connector 260 is provided on the case and includes four output terminals, two for each battery pack. A cover 218 is provided over the battery packs and is secured to case 214 to fully enclose the assembly and provide the completed intrinsically safe battery supply.

The invention is not to be limited by what has been particularly shown and described except as indicated in the appended claims.

What is claimed is:

1. For use with a resistance level and temperature sensor operative to provide a measure of the level and temperature of a fluent material, a readout and alarm system comprising:

a first housing containing:
an intrinsically safe first battery source for powering the circuits in the first housing:
circuit means for excitation of said resistance level sensor and sensing of sensor signal representing fluent material level;
circuit means for excitation of said resistance temperature sensor and sensing of sensor signal representing fluent material temperature;
an analog-to-digital converter;
switching means for selectively coupling the level sensor voltage or temperature sensor voltage to said converter;

a digital display for visually indicating fluent material level or temperature as selected by said switching means;

an alarm circuit for providing a level alarm signal upon sensing of a level sensor voltage which differs from a predetermined threshold;

an alarm level indicator activated by said level alarm signal;

a circuit for sensing low battery voltage of said first battery source and providing a low battery alarm signal;

a low battery indicator activated by the low battery alarm signal of said first battery source;

a circuit for sensing an open circuit condition and providing an open circuit alarm signal;

an open circuit indicator activated by the open circuit alarm signal;

a first terminal connected to said alarm circuit;

a second terminal coupled to electrical ground;

a third terminal connected to the first battery source;

a second housing containing:

an intrinsically safe second battery source for powering the circuits in the second housing;

a circuit for sensing low battery voltage of said second battery source and providing a low battery alarm signal;

a threshold circuit for providing an alarm threshold level;

an audible alarm sounder;

driver circuit means for said alarm sounder including means for causing said sounder to produce a first sound in response to an alarm signal above the alarm threshold level, and a second sound in response to said low battery alarm signal;

a cable coupling said first, second and third terminals to respective fourth, fifth and sixth terminals of said second housing;

the fourth terminal for coupling a received alarm signal to said threshold circuit;

a fifth terminal coupled to electrical ground; and switch means operative to interconnect said fifth and sixth terminals and connect said battery source to electrical ground.

2. The system of claim 1 wherein said system is operative with a plurality of level and temperature sensors and including:

a switching network for selectively coupling each sensor to an associated excitation and sensing circuit means.

3. The system of claim 2 including an averaging circuit operative in response to at least two of said level sensor signals to provide an output signal representative of the average fluent material level.

4. The system of claim 1 wherein said digital display includes a liquid crystal display and a heater in operative association with the liquid crystal display to permit reliable display indication at low temperatures.

5. The system of claim 4 wherein said first battery source includes a first power display circuit for energizing said digital display, display heater and analog-to-digital converter; and a second power supply circuit operative to energize all other circuits in said first housing.

6. The system of claim 1 wherein said alarm circuit for providing a level alarm signal includes means for providing a first level alarm signal representing a high fluent material level and means for providing a second level alarm signal representing an overfill fluent material level.

7. The system of claim 1 wherein said excitation and sensing circuit means for each of said sensors includes:

a constant current source for energizing of the associated resistance sensing element; and sensing circuitry operative to provide a sensor voltage representative of the sensed level or temperature.

8. The system of claim 7 wherein said sensing circuitry includes:

a damping circuit and a buffer circuit coupling the sensor voltage to one input of a differential amplifier;

a voltage reference source providing a reference voltage to the second input of the differential amplifier and defining a zero reference condition; and a span circuit coupling the output of the differential amplifier to said switching means and operative to calibrate the associated sensor output.

9. The system of claim 1 including an alarm test circuit for providing test signals to the level sensing circuits of said circuit means for simulating alarm level and open circuit alarm conditions.

10. The system of claim 1 wherein said driver circuit means includes a ramp generator means providing ramp signals, and a push-pull driver circuit operative in response to the ramp signals to drive said audible alarm sounder; and gate means selectively providing pulsed driver signals to the push-pull driver circuit.

11. The system of claim 1 wherein said battery sources each include first and second battery packs each having a plurality of standard battery cells;

a current limiting resistor for each battery pack;

an enclosure for said battery packs and current limiting resistors; and an output connector having a pair of output terminals for each battery pack to provide respective output voltages.

12. For use with a resistance level and temperature sensor operative to provide a measure of the level and temperature of a fluent material, a readout and alarm system having;

a first housing containing excitation and sensing circuitry for the sensors and a numerical readout of material level and temperature, alarm circuitry for sensing of alarm conditions and alarm indicators for denoting respective alarm conditions, and a battery source for powering the circuits in the first housing;

a second housing having an audible alarm sounder, driver circuit means for the alarm sounder, and a battery source for powering the circuits in the second housing;

connector means comprising:

a first cable on the first housing for coupling each sensor to the excitation and sensing circuitry and having redundant conductors for each sensor and terminating in a first electrical connector;

second cable means having a second connector matable with the first connector and having a dual cable path providing dual redundant conductors for each sensor, each dual cable path terminating in a respective connector;

a corresponding dual cable path having connectors matable with the connectors of the respective connectors of the second cable dual path and terminating in a single redundant cable path having a connector for coupling to an associated level and temperature sensor;

the connectors of each dual path being matable with each other to isolate the associated cable from the environment when the system is not in use; and a cable interconnecting the circuitry of the first and second housings.

13. The system of claim 1 wherein a plurality of readout and alarm units in respective first housings are connected to a single sounder unit in said second housing.

* * * * *